United States Patent
Jasrasaria

(10) Patent No.: US 8,086,569 B2
(45) Date of Patent: Dec. 27, 2011

(54) ASYNCHRONOUS DETECTION OF LOCAL EVENT BASED POINT-IN-TIME STATE OF LOCAL-COPY IN THE REMOTE-COPY IN A DELTA-SET ASYNCHRONOUS REMOTE REPLICATION

(75) Inventor: Suresh K. Jasrasaria, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 580 days.

(21) Appl. No.: 11/094,649

(22) Filed: Mar. 30, 2005

(65) Prior Publication Data

US 2006/0230082 A1    Oct. 12, 2006

(51) Int. Cl.
*G06F 7/00* (2006.01)
(52) U.S. Cl. .......... 707/625; 707/654; 707/668
(58) Field of Classification Search .......... 707/609, 707/610, 624, 625, 613, 616, 654, 668
See application file for complete search history.

(56) References Cited

U.S. PATENT DOCUMENTS

| | | | | |
|---|---|---|---|---|
| 5,261,094 A * | 11/1993 | Everson et al. | ............... | 707/201 |
| 5,623,599 A * | 4/1997 | Shomler | ............... | 714/18 |
| 6,304,882 B1 * | 10/2001 | Strellis et al. | ............... | 707/202 |
| 6,338,126 B1 * | 1/2002 | Ohran et al. | ............... | 711/162 |
| 6,647,399 B2 * | 11/2003 | Zaremba | ............... | 707/204 |
| 6,785,786 B1 * | 8/2004 | Gold et al. | ............... | 711/162 |
| 6,950,836 B2 * | 9/2005 | Lohn et al. | ............... | 1/1 |
| 2002/0174139 A1 * | 11/2002 | Midgley et al. | ............... | 707/204 |
| 2003/0093407 A1 * | 5/2003 | Cochrane et al. | ............... | 707/2 |
| 2004/0024979 A1 * | 2/2004 | Kaminsky et al. | ............... | 711/162 |
| 2004/0034752 A1 * | 2/2004 | Ohran | ............... | 711/161 |
| 2004/0267836 A1 * | 12/2004 | Armangau et al. | ............... | 707/203 |
| 2005/0044088 A1 * | 2/2005 | Lindsay et al. | ............... | 707/100 |
| 2005/0049945 A1 * | 3/2005 | Bourbonnais et al. | ............... | 705/30 |
| 2005/0171979 A1 * | 8/2005 | Stager et al. | ............... | 707/200 |
| 2005/0172092 A1 * | 8/2005 | Lam et al. | ............... | 711/161 |
| 2005/0235019 A1 * | 10/2005 | Yang | ............... | 707/204 |

OTHER PUBLICATIONS

PCT/US2006/008426 International Search Report dated Jul. 7, 2006 (4 pgs).

* cited by examiner

*Primary Examiner* — John R. Cottingham
*Assistant Examiner* — Nirav K Khakhar
(74) *Attorney, Agent, or Firm* — Guerin & Rodriguez, LLP; Michael A. Rodriguez

(57) ABSTRACT

A storage system executes a delta set asynchronous remote replication protocol, wherein writes to a local copy are aggregated into delta sets during successive delta cycles. The delta sets are sent to a remote storage system to be written to a remote copy. Independent of the delta cycles, the local storage system receives a signal representing an external event. In response to receiving the signal, all writes just prior to and in accordance with the external event are posted to the local copy, the current delta set is ended, and a marker delta set is inserted in the delta set stream. The delta sets received at the remote storage system are monitored for the marker delta set. When the marker delta set is received, it is indicated that the remote copy is consistent with the local copy just prior to the external event at the local storage system.

18 Claims, 17 Drawing Sheets

ASYNCHRONOUS DETECTION OF LOCAL EVENT BASED POINT-IN-TIME STATE OF LOCAL-COPY IN THE REMOTE-COPY IN A DELTA-SET ASYNCHRONOUS REMOTE REPLICATION

FIELD OF THE INVENTION

The present invention relates generally to storage systems, and particularly to remote replication methods for disaster recovery.

BACKGROUND OF THE INVENTION

In today's technological era, businesses and government entities are increasingly reliant upon high performance computing and storage systems. A massive amount of critical data, such as financial, personal, entertainment, and corporate data, is stored in electronic form on storage systems. Loss of such data cannot be tolerated; thus, many safeguarding methods are employed in storage systems.

As part of safeguarding such critical data, the effects of a disaster must be considered. A natural disaster such as a flood or earthquake, or a technical disaster such as a major computer failure, could render a storage system useless, and thus the data it contains non-accessible or destroyed. Remote replication storage systems have been employed to circumvent this unacceptable possibility. In a remote replication storage system, data is stored as usual at a local site where applications normally execute. Another storage system is deployed at a remote site—possibly many miles away. All the data stored at the local site is also copied to the remote site. Thus, if a disaster occurs at the local site, the data, at least up to a point in time, can be recovered at the remote site. Data copy at the remote site can also be used for backup, vaulting and archiving for regulatory compliance and other applications for parallel processing of remotely copied data.

There are various types of remote replication methods, each having advantages and disadvantages. In accordance with synchronous remote replication methods, an update to a local copy is not allowed to complete to the application until it has also been successfully stored at the remote site. The synchronous method is highly desirable, as both the local and remote copies always contain the same application data at any point in time. However, synchronous methods cannot be reasonably deployed over long distances, because application performance is negatively affected by the time it takes to transfer the data to the remote site to complete each I/O operation. In accordance with asynchronous write ordered remote replication methods, an update to a local copy is queued at the local site for transfer to the storage at the remote site, and then the update is allowed to complete to the application. Asynchronous write ordered remote replication methods offer distance independence and thus higher application performance than synchronous methods, with the added risk that, in case of a disaster at the local site, some of the queued storage operations may not be completely transferred to the remote site resulting in some data loss.

Both the synchronous and the write ordered asynchronous methods share a common disadvantage. That is, if multiple updates to the same location in local storage are made by the application, all the updates are sent to the remote site. In accordance with the concept of locality of reference, such multiple updates occur often. A third type of remote replication method takes advantage of locality of reference to offer a higher efficiency remote replication solution. This method is referred to as delta set based asynchronous remote replication. In accordance with this method, writes to a local copy are aggregated over a period of time, known as a "delta cycle", into a "delta set". Upon expiration of the time period, the delta set containing the aggregated writes is transferred, all or nothing, to the remote site. It can be seen that multiple updates to the same location in a local site during a delta cycle are transferred as one update to the remote site, thus decreasing bandwidth requirements between sites and increasing efficiency. Delta set based asynchronous remote replication is therefore a highly efficient long distance replication method that provides higher application performance than synchronous replication.

Because delta set based asynchronous remote replication aggregates writes to the local copy over time, particular types of operations, for example Microsoft Volume Shadow Copy Services (VSS), that rely on an external event based exact point-in-time state of the local copy may be negatively affected. The external event based exact point-in-time state of the local copy after such operations may not be reproducible at the remote copy in a delta set asynchronous remote replication. As a result, in delta set based asynchronous remote replication it is desirable to provide a mechanism that can identify local events and capture the point-in-time state of the local copy at the time of the event, independent of the delta cycles, and detect exactly the same point-in-time state of local copy on the remote copy.

SUMMARY OF THE INVENTION

In accordance with the principles of the invention, methods, apparatus, and program products are provided for use in a storage system. The storage system executes a delta set asynchronous remote replication protocol. Accordingly, writes to a local copy are aggregated into delta sets during successive delta cycles. The delta sets are then sent to a remote storage site to be written to a remote copy. A signal is received representing an external event. In response to receiving the signal, after the modifications due to the external event are recorded on the local copy, the delta set corresponding to the current delta cycle is brought to an end and a new delta set, hereafter referred to as a marker delta set or a marker set, is inserted on the local storage site. The delta sets received at the remote storage site are monitored for the marker set. When the marker set is received, it is indicated that the state of the remote copy is consistent with the exact point-in-time state of the local copy in response to receipt of the external event on the local storage site. More particularly, a marker delta cycle, hereafter referred to as a marker cycle, is inserted in a delta set based asynchronous remote replication protocol to capture the exact point-in-time state of the local copy on the remote copy without disturbing the asynchronous nature of the remote replication. Accordingly, on the local site a marker cycle is inserted by ending the current delta cycle; starting a marker cycle; inserting a marker set; ending the marker cycle; and then resuming the delta set asynchronous remote replication protocol as before by asynchronously transferring the marker set to the remote site; and detecting the marker set on the remote site.

The invention enables the advantages of delta set based asynchronous remote replication to be employed in systems where applications (like Microsoft Exchange) perform operations (like Microsoft VSS) that rely on an external event based exact point-in-time state of the local copy to be available on the remote copy for the application (like Microsoft Exchange) to be able to restart and recover from the remote copy at the remote site.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
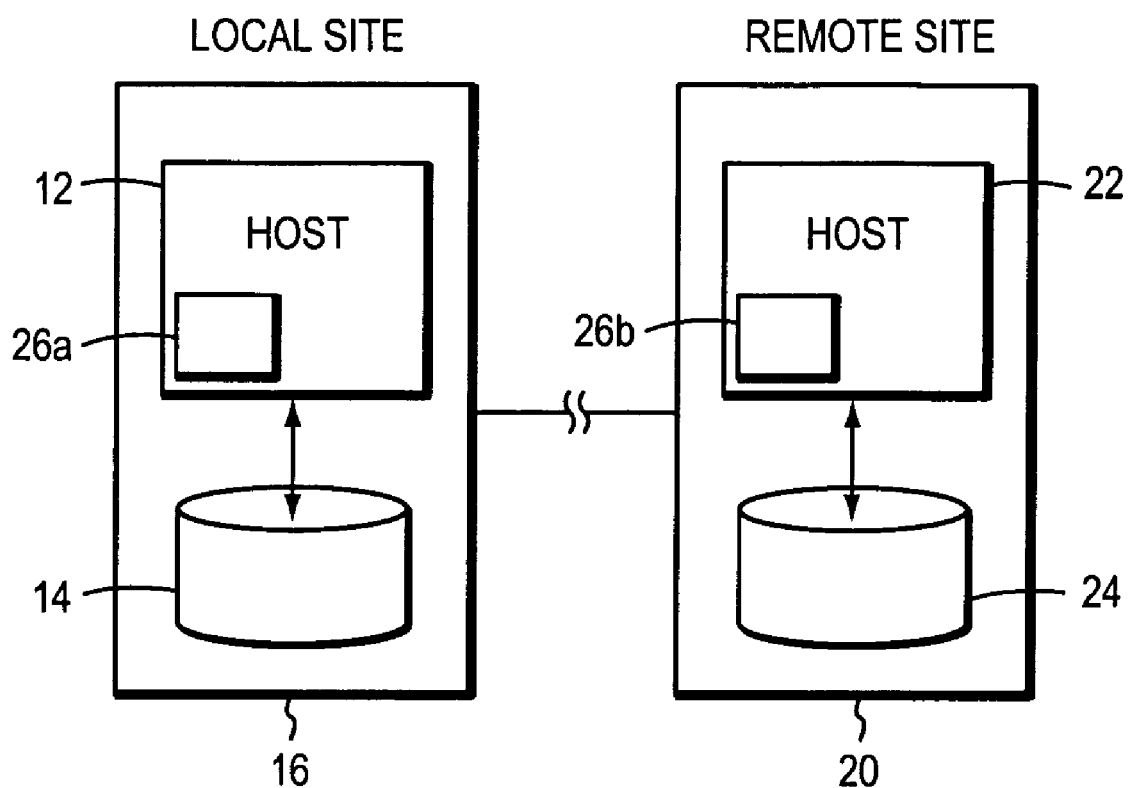
FIG. 1 is a block diagram of a remote replication system.

Referring to FIG. 1, there is shown an exemplary system 10 employing a remote replication storage system for disaster recovery. Accordingly, one or more host systems 12 are coupled to a primary storage system 14 at a local site 16. The primary storage system 14 is coupled in turn to a remote site 20 that includes one or more remote hosts 22 coupled to a remote storage system 24. The host systems 12 execute one or more applications 26a that transfer data to and from the primary storage system 14. The primary storage system 14 ensures that all application data is copied to the remote storage system 24. The remote site 20 is preferably geographically remote from the local site 16 in order to ensure that, in the event of a disaster affecting the local site 16, depending upon the severity of the disaster, applications may recover and restart either on local hosts 12 or remote hosts 22 from the copy of data stored on remote storage system 24 at the remote site 20. After a disaster, either applications 26a on the host systems 12 at the local site 16 may recover and restart using the data restored by the local storage system 14 from the remote storage system 24, or applications 26b on the remote hosts 22 located at the remote site 20 may resume operations after recovering and restarting the data stored on the remote storage system 24.

The host systems 12 of FIG. 1 may be computer systems operating any of various operating systems such as Microsoft Windows, Sun Solaris, Linux, etc. The host systems 12 may execute one or more applications 26a such as Oracle database, Microsoft Exchange, etc. The primary and remote storage systems 14 and 24 may be for example Symmetrix DMX or CLARiiON CX systems provided by EMC Corporation of Hopkinton, Mass., USA. Any combination of these components may be employed in the environment shown in FIG. 1 without departing from the principles of the invention.

The replication method employed by the primary and remote storage systems 16 and 20 is a delta-set based asynchronous remote replication method. A delta-set based asynchronous remote replication method aggregates all the changes being made on the local site to a local copy on the primary storage system 14 over a certain period of time, and then sends the aggregate changes asynchronously to the remote site 20 to be applied to a remote copy on the remote storage system 24.

Figure 2:
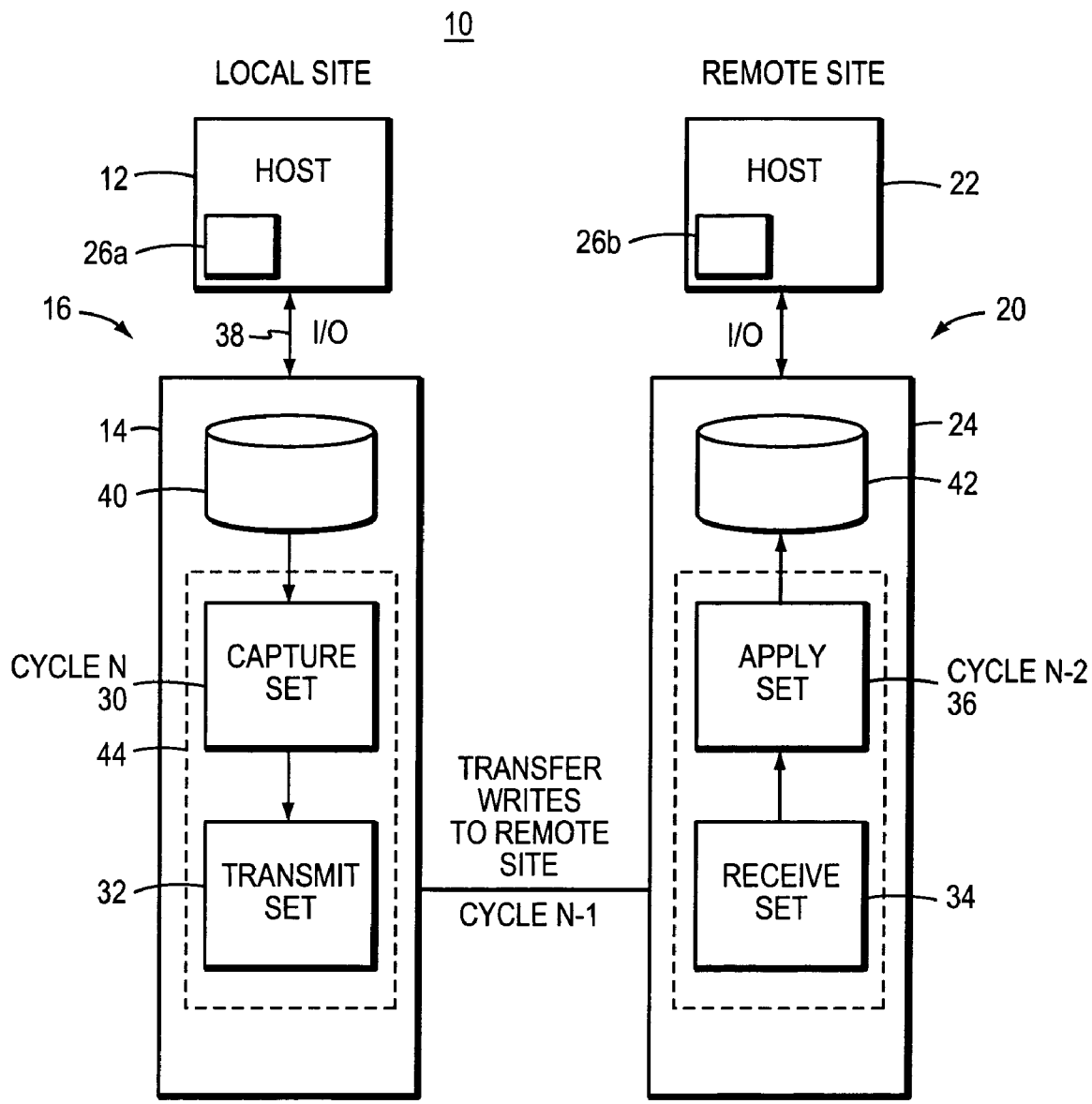
FIG. 2 is a block diagram of a remote replication system employing delta set based asynchronous remote replication.

Referring to FIG. 2, there is shown a block diagram of the system 10 employing delta-set based asynchronous remote replication. Four delta sets 30, 32, 34, and 36 are shown. The operation of each delta set is shown in FIGS. 3-6.

Generally, in accordance with the delta set based asynchronous remote replication method, host I/O operations 38 to the local copy 40 in the local storage system 14 are aggregated over a delta set time period, or "delta cycle", into the capture delta set 30. Upon expiration of the delta cycle, the capture delta set 30 is promoted to the transmit delta set 32. The transmit delta set 32 is transferred to the receive delta set 34 on the remote storage system 24. Once all data has been received, the receive delta set 34 is promoted to the apply delta set 36. The contents of the apply delta set 36 are then posted to the remote copy 42.

Figure 3:
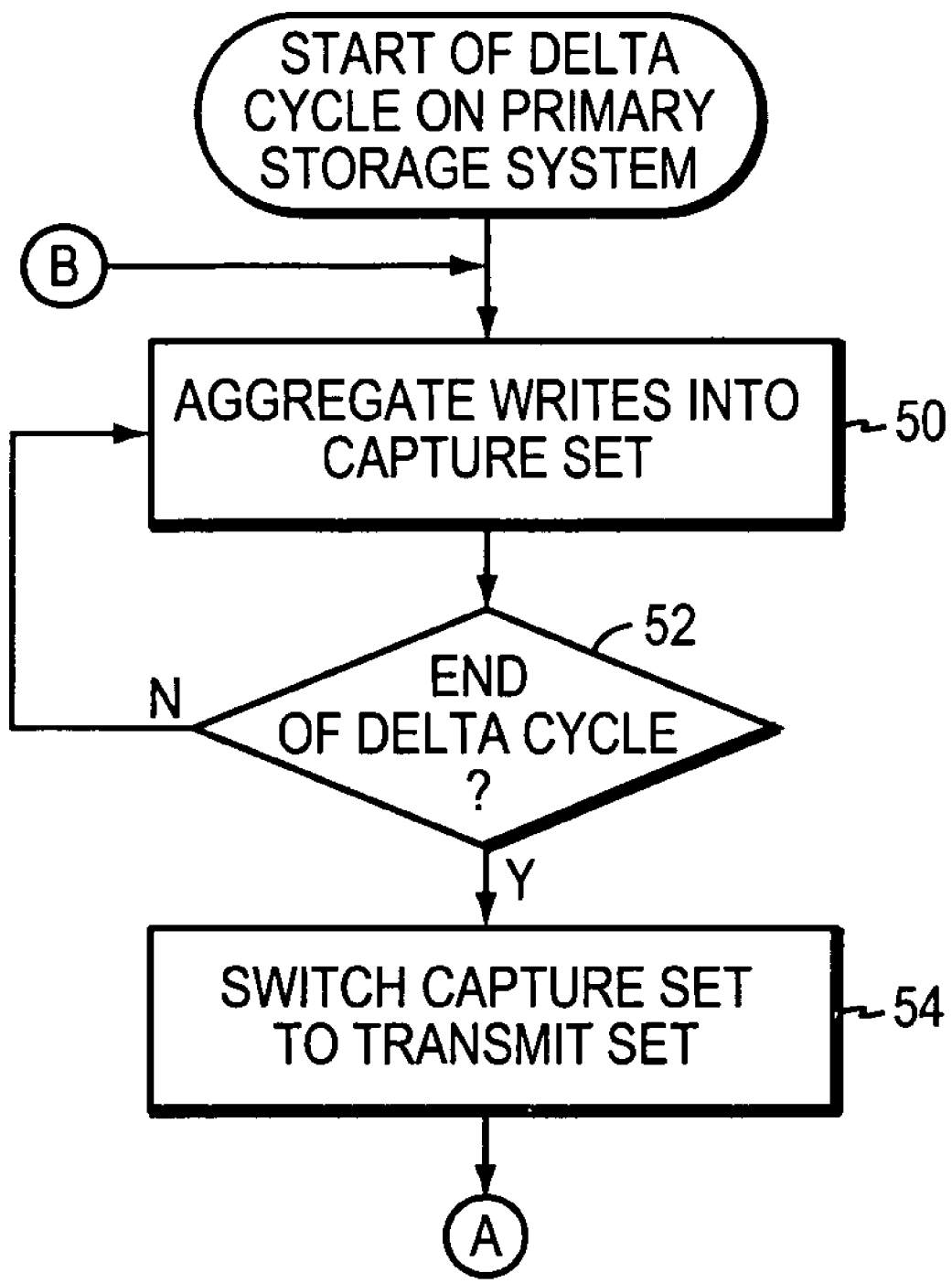
FIG. 3 is a flow diagram of the operation of the capture delta set portion of the delta cycle on the local storage system.

More particularly, referring to FIGS. 2 and 3, a host 12 at the local site 16 performs I/O operations 38 to a local copy 40 in the local storage system 14. The I/O operations 38 are aggregated in the capture delta set 30 over a certain delta set time period, or delta cycle—typically 5 to 60 seconds on a Symmetrix DMX and 1 to 30 minutes on a CLARiiON CX (steps 50, 52). Upon expiration of the delta set time period (step 52), a delta set switch process switches the capture delta set 30 to the transmit delta set 32 (step 54). Capture and transmit delta sets 30 and 32 are portion of a cache 44—typically solid state memory slots on a Symmetrix DMX and magnetic disk memory blocks on a CLARiiON CX.

Figure 4:
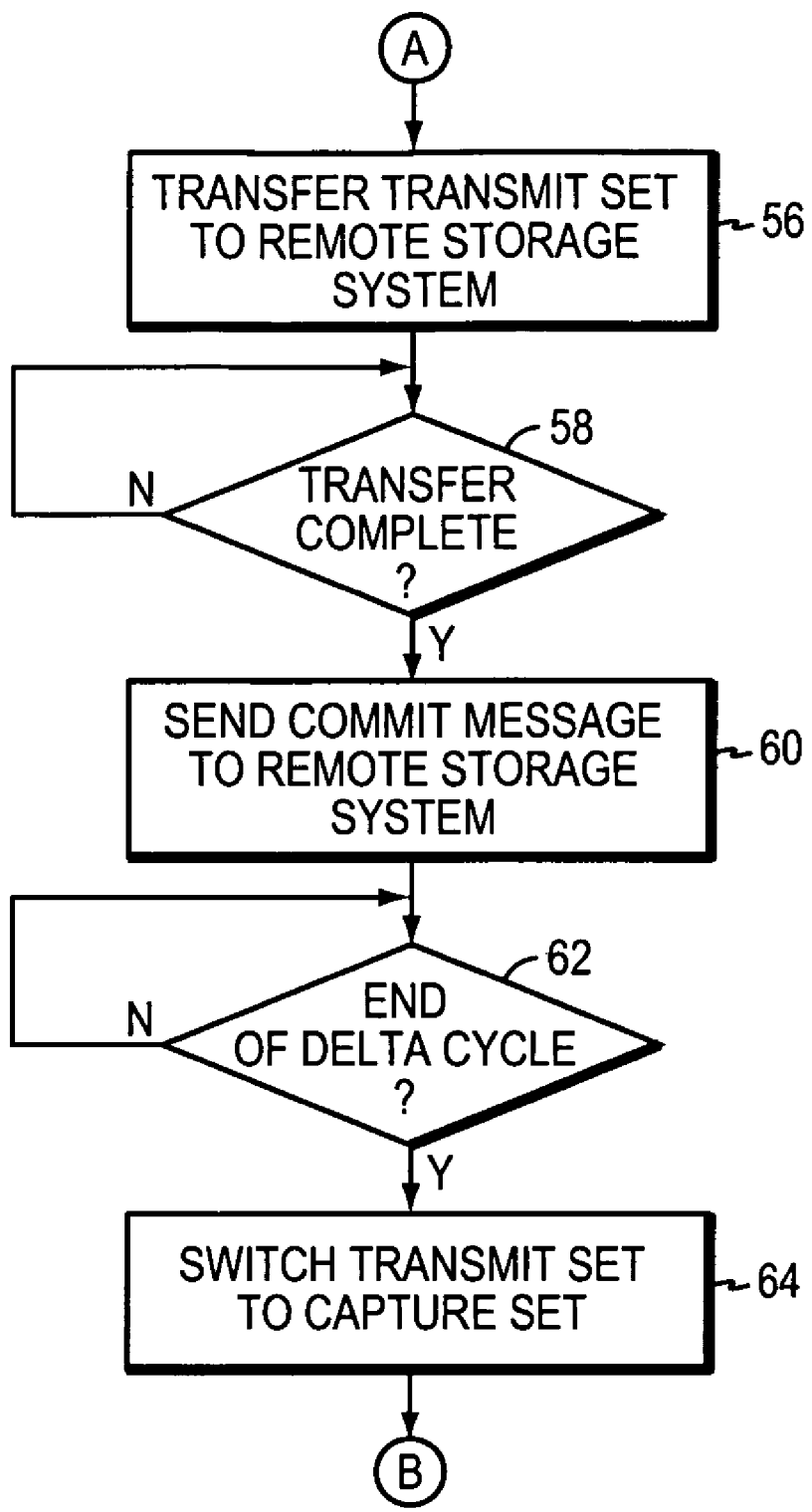
FIG. 4 is a flow diagram of the operation of the transmit delta set portion of the delta cycle on the local storage system.

Meanwhile, referring to FIGS. 2, 3, and 4, during a given delta cycle, independent of the I/O operations being captured in the capture delta set 30, data is transferred from the transmit delta set 32 to the remote storage system 24 (step 56). Once the transfer is complete (step 58), a "commit message" is sent to the remote storage system (step 60), to be further explained later. Then, at the end of the delta cycle (step 62), the transmit delta set is switched back to the capture delta set (step 64).

Thus, while the capture delta set is capturing I/O operations from the host 12 during a current delta cycle (indicated in FIG. 2 as "cycle N"), the transmit delta set is transferring the I/Os aggregated over the previous delta cycle (indicated in FIG. 2 as "cycle N−1"). At the end of the delta cycle, the capture and transmit delta sets 30 and 32 swap roles. The delta sets themselves may be implemented, for example, in Symmetrix DMX as a collection of pointers to memory slots in the solid state memory cache 44 or in CLARiiON CX as a collection of pointers to blocks in the magnetic disk snap cache 44.

Figure 5:
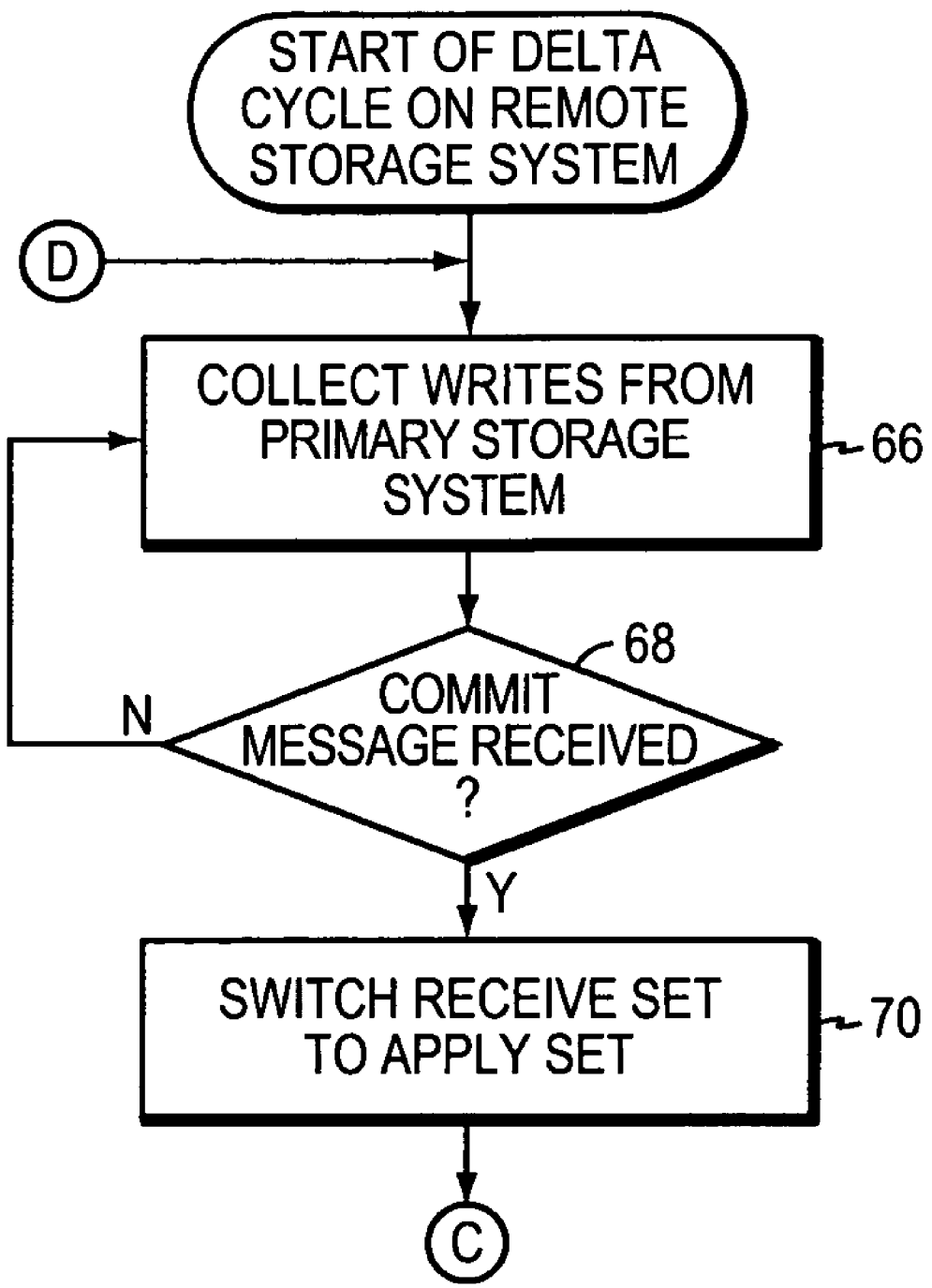
FIG. 5 is a flow diagram of the operation of the receive delta set portion of the delta cycle on the remote storage system.

Referring to FIGS. 2 and 5, at the remote site 20, the remote storage system 24 includes a receive delta set 34, which collects the writes from its partner transmit delta set 32 at the local site 16 (step 66). Receipt of the "commit message" from the local site 16 indicates that all writes from the current transmit set 32 have been transferred from the local site (step 68), so the receive delta set is switched to the apply delta set (step 70).

Figure 6:
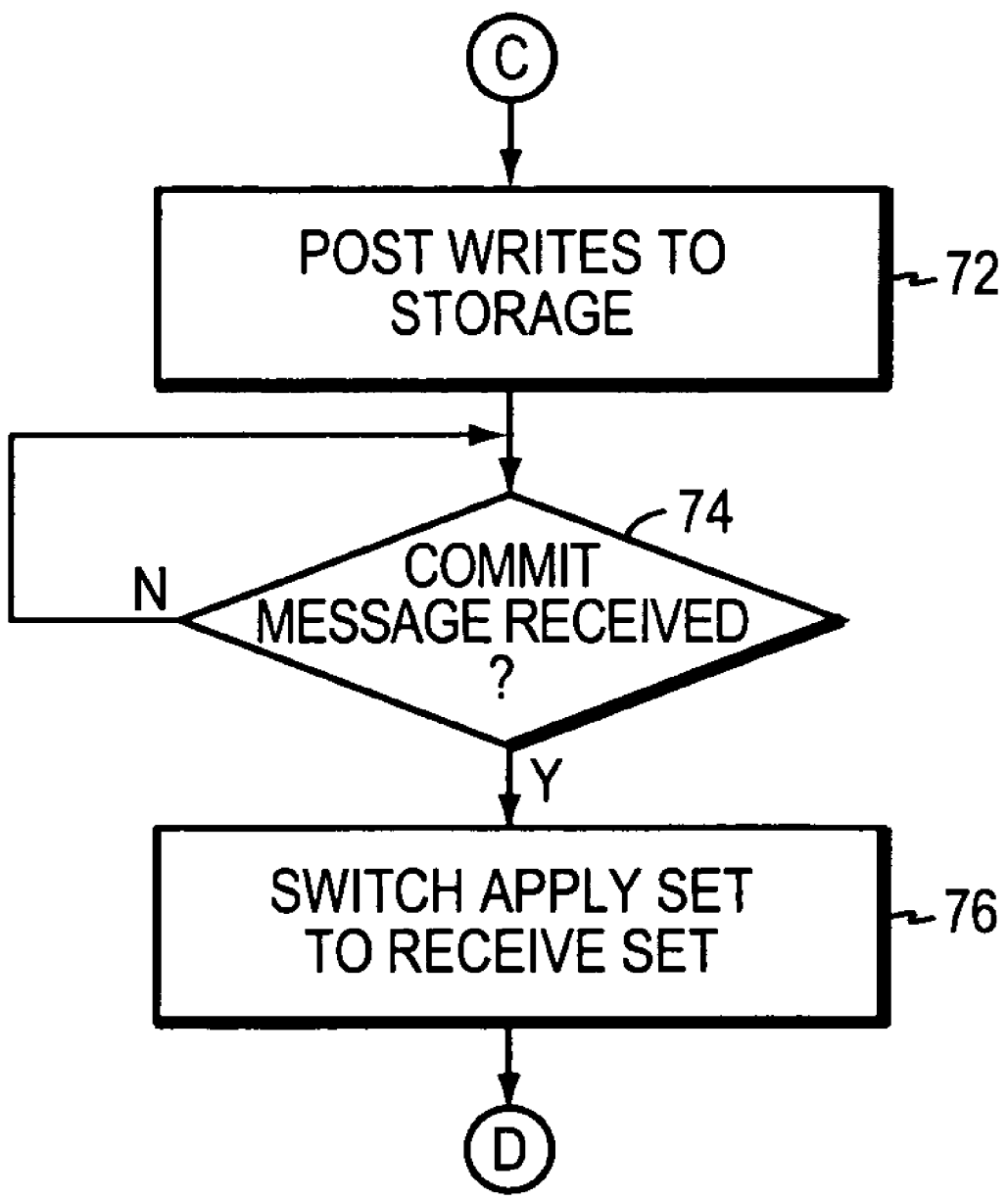
FIG. 6 is a flow diagram of the operation of the apply delta set portion of the delta cycle on the remote storage system.

Referring to FIGS. 2 and 6, at the remote storage system 24 the apply delta set 36 drains the data from memory to the remote copy 42 (step 72). The switch process initiated by the "commit message" then switches the apply set to the receive set (steps 74, 76). (As with the capture and transmit delta sets 30 and 32, the receive and apply delta sets 34 and 36 swap roles.) At this point, the remote copy 42 is at most two delta cycles behind the local copy 40, as shown in FIG. 2 as "cycle N−2". Thus, in the event of a failure at the local site 16, data can be recovered at the remote site 20 to within at most two delta cycles of the time at which the failure occurred.

The delta set based asynchronous remote replication method is highly advantageous in that it has no impact on production applications and no distance limitations. However, an adverse effect can arise in certain circumstances. If an external synchronizing event occurs at a local site independent of the delta-set based cycles, for example in the middle of a delta cycle, and accordingly changes are made to the local copy, it is not possible to capture the point-in-time state of the changed local copy at the remote site as it existed at the exact point-in-time that the synchronizing event occurred at the local site. This is because the capture delta set will capture I/O operations before, during and after the external event as an aggregate and post all writes to the remote copy as an aggregate—all or nothing—once the "commit message" is received. Only the aggregate is sent to the remote site—thus the state of the local copy at the exact point-in-time the external synchronizing event occurred cannot be reproduced on the remote copy.

Certain applications running on the local host do make use of such external synchronizing events and do require that an exact point-in-time state of the local copy be reproduced on the remote copy at the remote site under certain circumstances. An example of such an application using a synchronizing external event includes Microsoft Exchange using Volume Shadow Copy Services to create a recoverable state of the local copy of Microsoft Exchange.

Generally, if an event occurs or the end of a program or a set of operations is reached at any random point in time independent of the delta cycles (hereinafter "external event") and changes are made to the data on the local copy, due to the fact that all changes to the data on the local copy are aggregated in each delta cycle and applied to the remote copy all or nothing, it is not possible to detect the same point-in-time image of the local copy of the data on the remote copy of data, unless: 1) all the changes to the local copy due to the external event are captured at precisely the end of a delta set cycle, and 2) the asynchronous remote replication method shifts into a synchronous mode and waits for the changes due to the external event on the local copy to propagate to the remote copy. Imposing such restrictions for detecting the local event based same point-in-time image of the local copy on the remote copy is not practical and susceptible to distance dependent application response time delays on the local site.

In accordance with the principles of the invention, there is presented a method that solves the above mentioned problem. The inventive solution implements the following basic steps over the known delta set based asynchronous remote replication method:

1) On the local storage system: Closing the current delta cycle and the current delta set and inserting a marker delta set immediately after changes are made to the local copy by an external synchronizing event; and 2) On the remote storage system: At the end of each delta cycle watching for the marker delta set to appear.

Once the marker delta set appears on the remote storage system, the inventive method declares the remote copy to be the exact point-in-time replica of the local copy at the same point-in-time when the marker delta set was inserted just after the external event was received on the local storage system.

It will be shown that the insertion of the marker set just after the changes made in accordance with the external event are captured in the local copy means that all the changes prior to the external event are captured in the delta set just prior to the newly inserted marker set. Moreover, the appearance of the marker set on the remote storage system means that all the previously captured delta sets have already been received and posted to the remote copy. As a result, by implementing the above mentioned steps of the inventive solution it is possible to obtain the same external event based point-in-time replica of the local copy on the remote copy while the delta set based asynchronous remote replication method can continue to work asynchronously.

Figure 7:
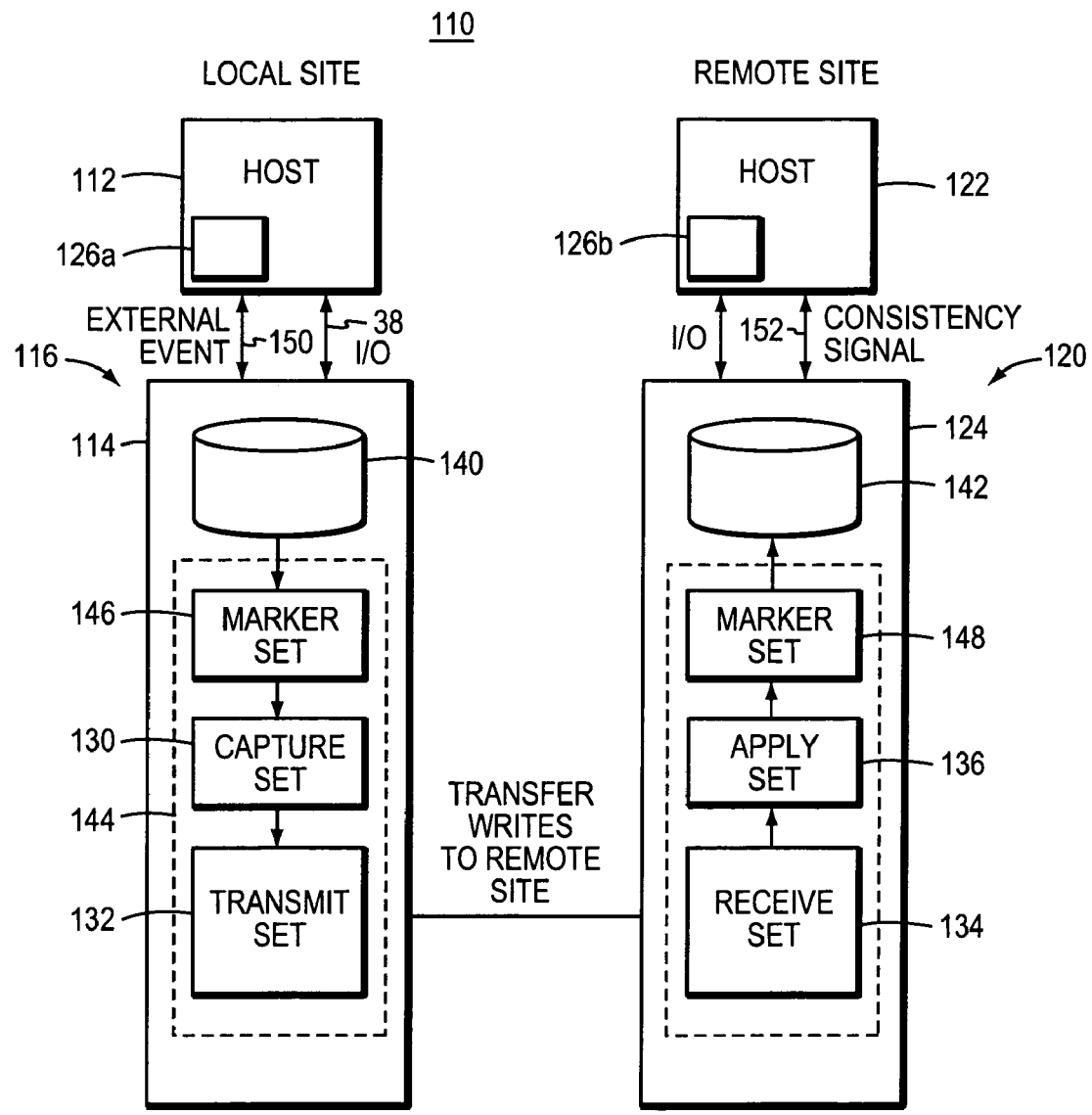
FIG. 7 is a block diagram of a remote replication system employing delta set based asynchronous remote replication using a marker set in accordance with the invention.

Referring now to FIG. 7, there is shown the delta set based asynchronous remote replication method in accordance with the invention. Reference numbers in FIG. 7 correspond to those of FIG. 2 plus 100. FIG. 7 is the same as FIG. 2 except that an independent external event 150 is received at the local storage system 114 during a delta cycle, which in turn causes a marker delta set 146 to be inserted in the local storage system 114. A consistency signal 152 is generated when a marker delta set 148 is received at the remote storage system 124 and the remote copy 142 is declared consistent with the local copy 140 just after the receipt of the external event 150. (The marker set is referred to as 146 at the local storage system 114 and then as 148 after propagating to the remote storage system 124.)

Figure 8:
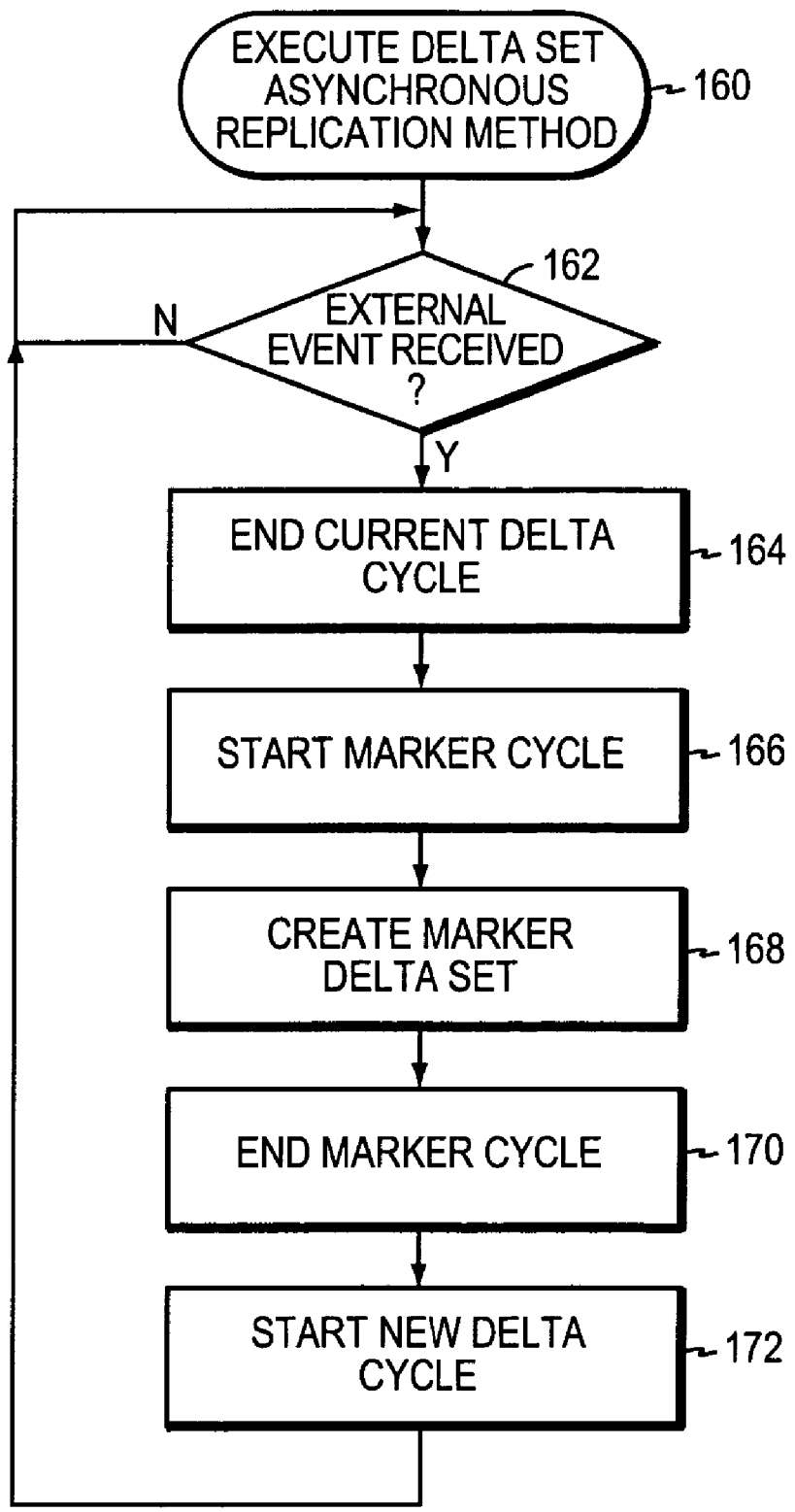
FIG. 8 is a flow diagram showing the basic steps of an implementation of the invention at the local site.
Figure 9:
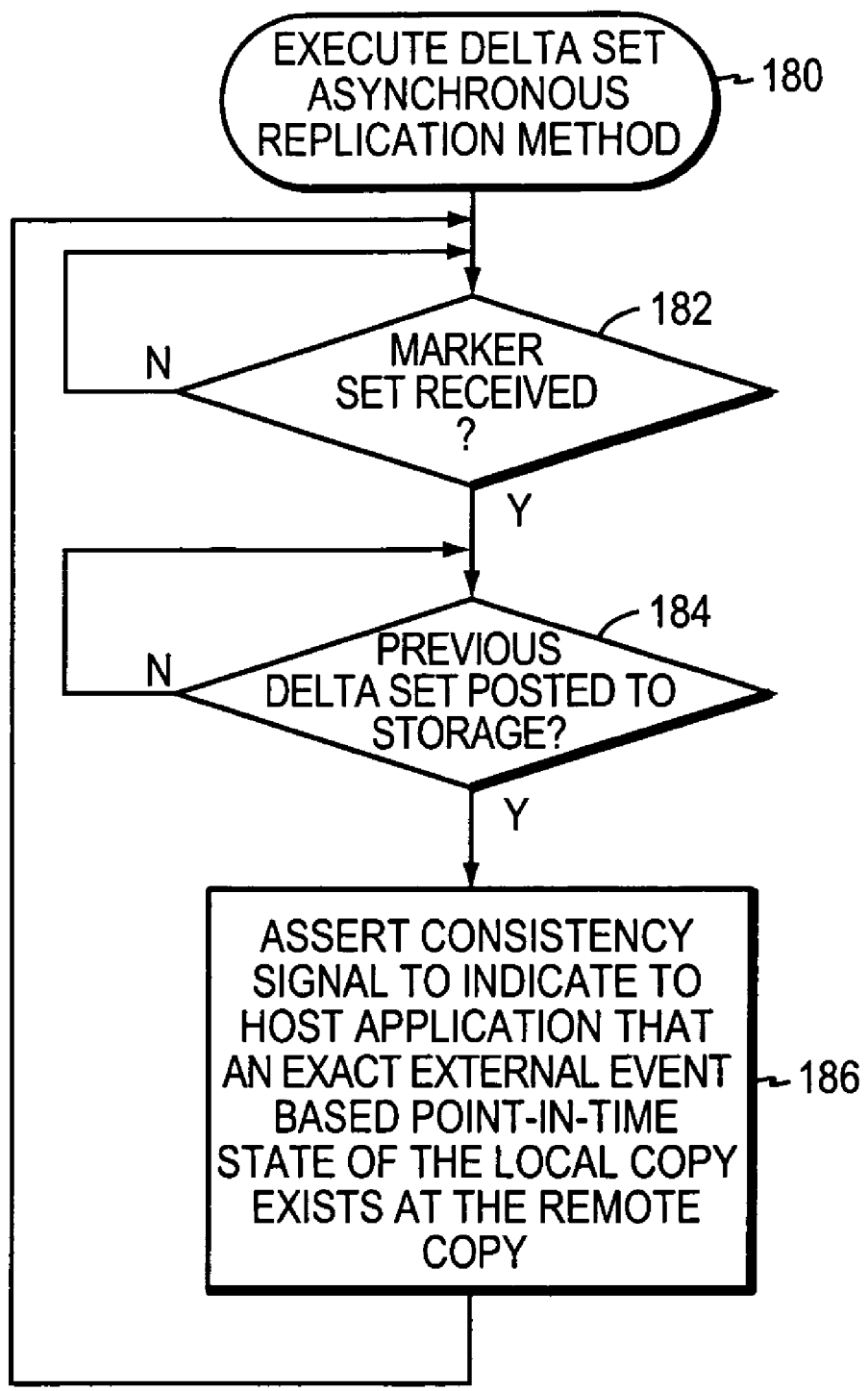
FIG. 9 is a flow diagram showing the basic steps of an implementation of the invention at the remote site.

One implementation of the basic steps in the local and remote storage systems, in accordance with the invention, is shown in FIGS. 8 and 9 respectively.

Referring to FIGS. 7 and 8, on the local storage system 114, as the delta set asynchronous replication method executes (step 160), an external event is received at the primary storage system 114 (step 162). If this occurs, the current delta cycle is ended (step 164). This ensures that the writes caused by the external event are the last writes in the current delta cycle. A new delta cycle of very small fixed duration is then begun, referred to herein as the "marker cycle" (step 166). During the marker cycle, a "marker delta set" 146 is created on the local storage system (step 168). The marker cycle is then ended (step 170). A new delta cycle is then begun (step 172) and normal delta set replication is resumed.

Referring now to FIGS. 7 and 9, on the remote storage system 124, as the delta set asynchronous replication method executes (step 180), if a marker delta set is received (step 182)

then it is known that when the prior delta set is posted to the remote copy it marks the point where an exactly same consistent point-in-time state of local copy just after the external event is received at the local storage system 114 exists on the remote storage system 124. Once the apply delta set has been fully posted (step 184), the consistency signal 152 is asserted (step 186) to notify host applications 126b that the changes on the local copy 140 due to the external synchronizing event 150 have completely been posted to the remote copy 142 and that the external event based consistent point-in-time state of the local copy is available at the remote copy for use by the applications 126b.

A marker cycle is referred to as a "micro cycle" because it is much shorter in time than any regular delta cycle. A marker delta set may be created for example on the order of 5 milliseconds on a Symmetrix DMX with a high speed solid state memory cache and on the order of 500 milliseconds on a CLARiiON CX with magnetic disk memory cache implementations. It is thus apparent that insertion of a marker cycle has relatively negligible impact (when compared to the length of a regular delta cycle) on storage system or host application performance.

Figure 10:
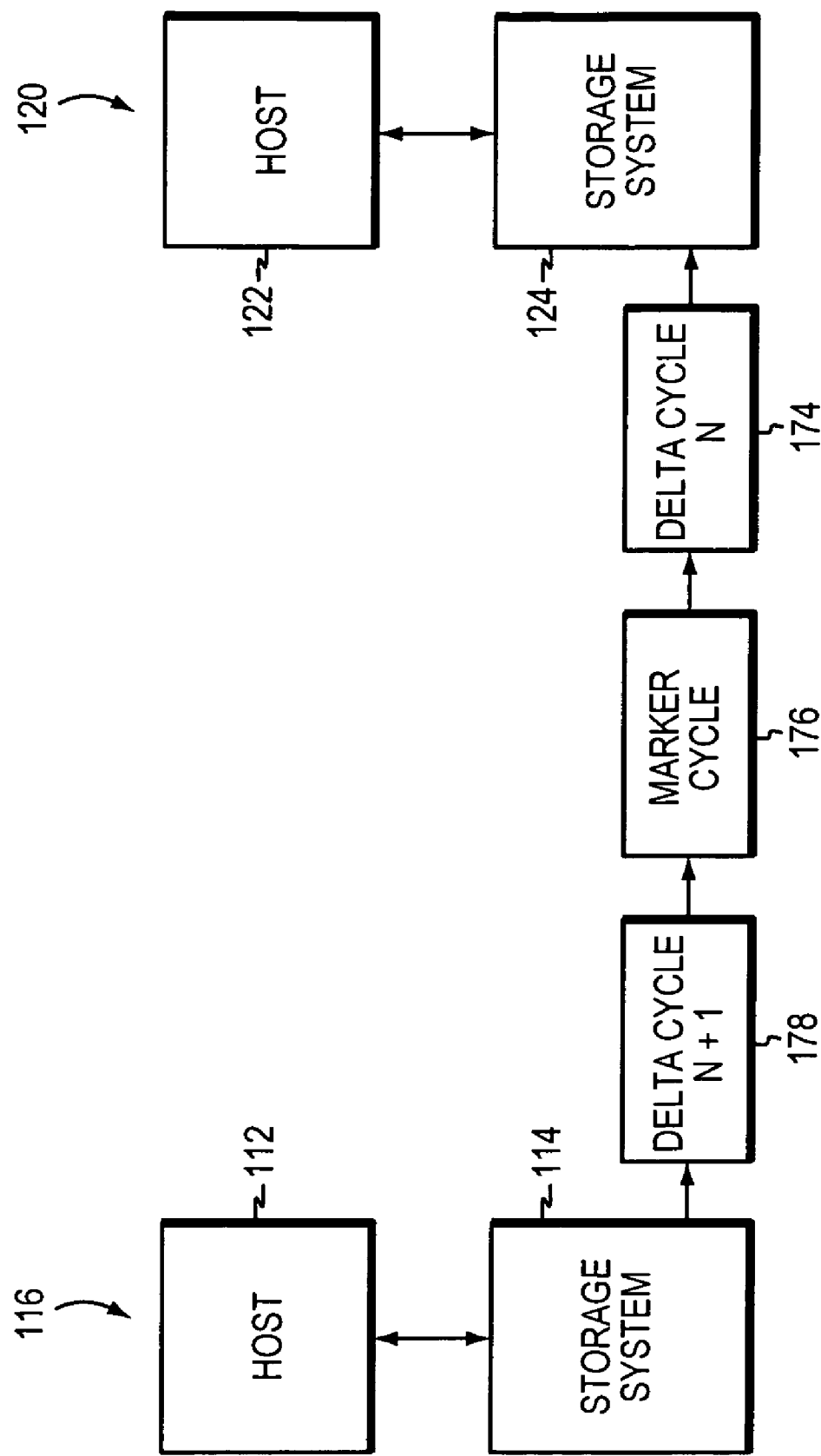
FIG. 10 is a block diagram showing the delta set transfers from the local site to the remote site for an implementation of FIGS. 8 and 9.

Referring to FIG. 10, a block diagram depicts the delta cycles transferred between the local site 116 and remote site 120. Delta cycle N 174 includes as its last entries the writes performed just prior to the external event. Delta cycle N 174 is followed by the very short marker cycle 176 containing a marker delta set 146. The marker cycle 176 is followed by the next delta cycle (N+1) 178.

Figure 11:
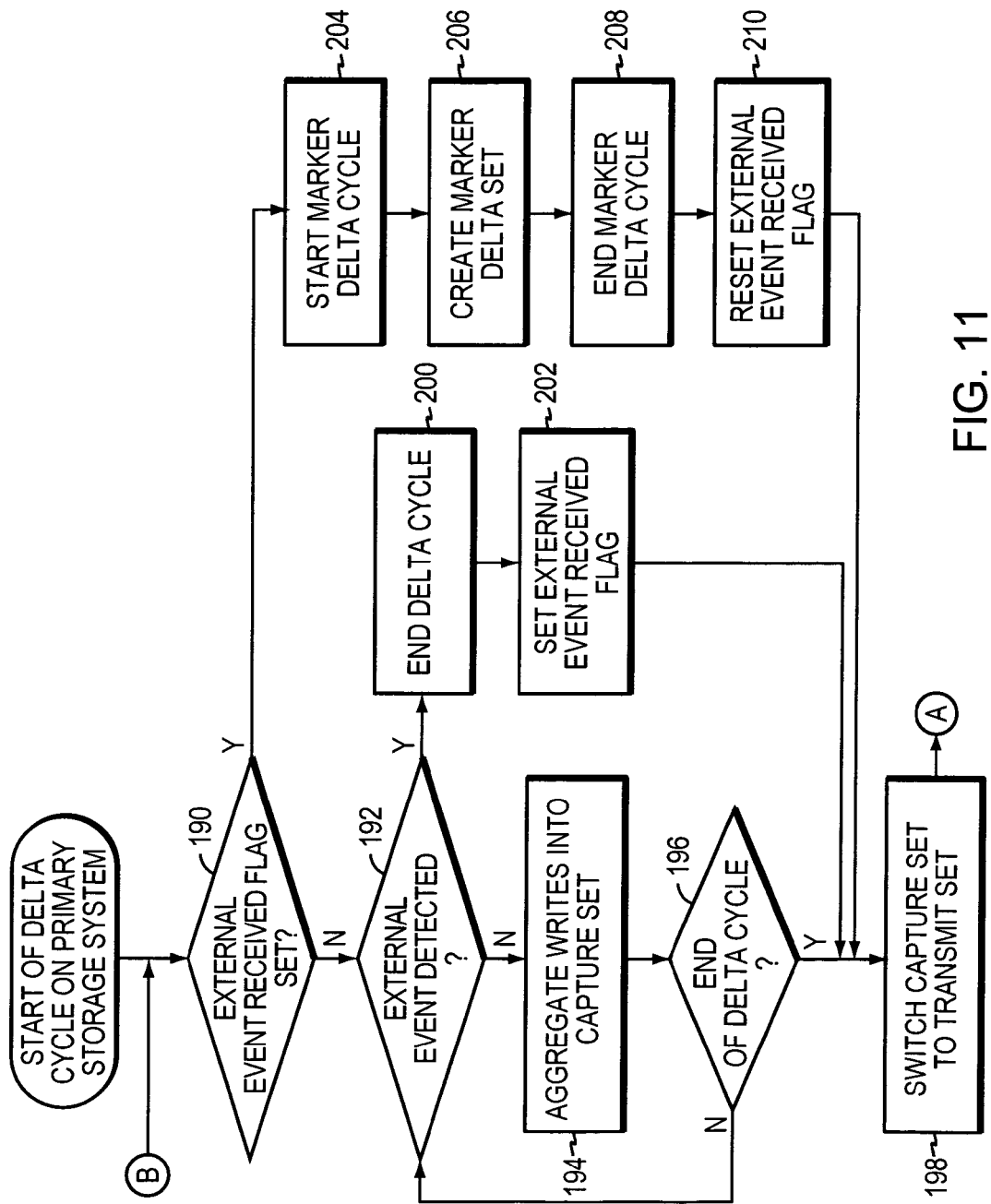
FIG. 11 is a flow diagram of the operation of the capture delta set portion of the delta set based asynchronous remote replication method in accordance with one possible modification to support the implementation of FIG. 8 at the local site.

The basic operations of FIG. 8 can be implemented for example by modifying the capture delta set process of FIG. 3 as shown in FIG. 11. An "external event received" flag is provided to indicate when a marker delta set should be inserted. If the "external event received flag" is not set (step 190), and no external event is detected (step 192), writes are aggregated into the capture set (step 194) as in FIG. 3. If the end of the delta cycle is reached (step 196) without any external event having occurred, then the capture set switches to the transmit set as in FIG. 3 (step 198). However, if an external event occurs during write aggregation (step 192), then the current delta cycle is ended (step 200) and the "external event received" flag is set (step 202). It is now known that the end of the current delta set marks the point at which the modifications just prior to and in accordance with the external event have been captured in the local copy and the current delta set. Ending the delta cycle causes the capture set to switch to the transmit set (step 198), and the delta set propagates to the remote site as shown in FIG. 4. When the transmit set process of FIG. 4 completes and returns to step 190 of the capture set process of FIG. 11, the marker delta set is inserted as follows. At step 190, the "external event received" flag is now set. The set "external event receive flag" indicates that a marker delta cycle should now be inserted. Therefore, a marker delta cycle is begun (step 204), and the marker delta set is created as a new capture set (step 206). The marker delta cycle is then ended (step 208), and the "external event received" flag is reset (step 210). The newly inserted capture set, which is also the marker delta set, is now switched to the transmit set (step 198) and the marker set is sent to the remote site as shown in FIG. 4. This time, when the transmit set process of FIG. 4 completes and returns to step 190 of the capture set process of FIG. 11, since the "external event received" flag has been reset, normal delta set asynchronous replication resumes (steps 192, 194, 196).

The transmit and receive delta set processes of FIGS. 4 and 5 proceed as previously described with no change, causing the marker delta set to propagate to the remote site as shown in FIG. 10.

Figure 12:
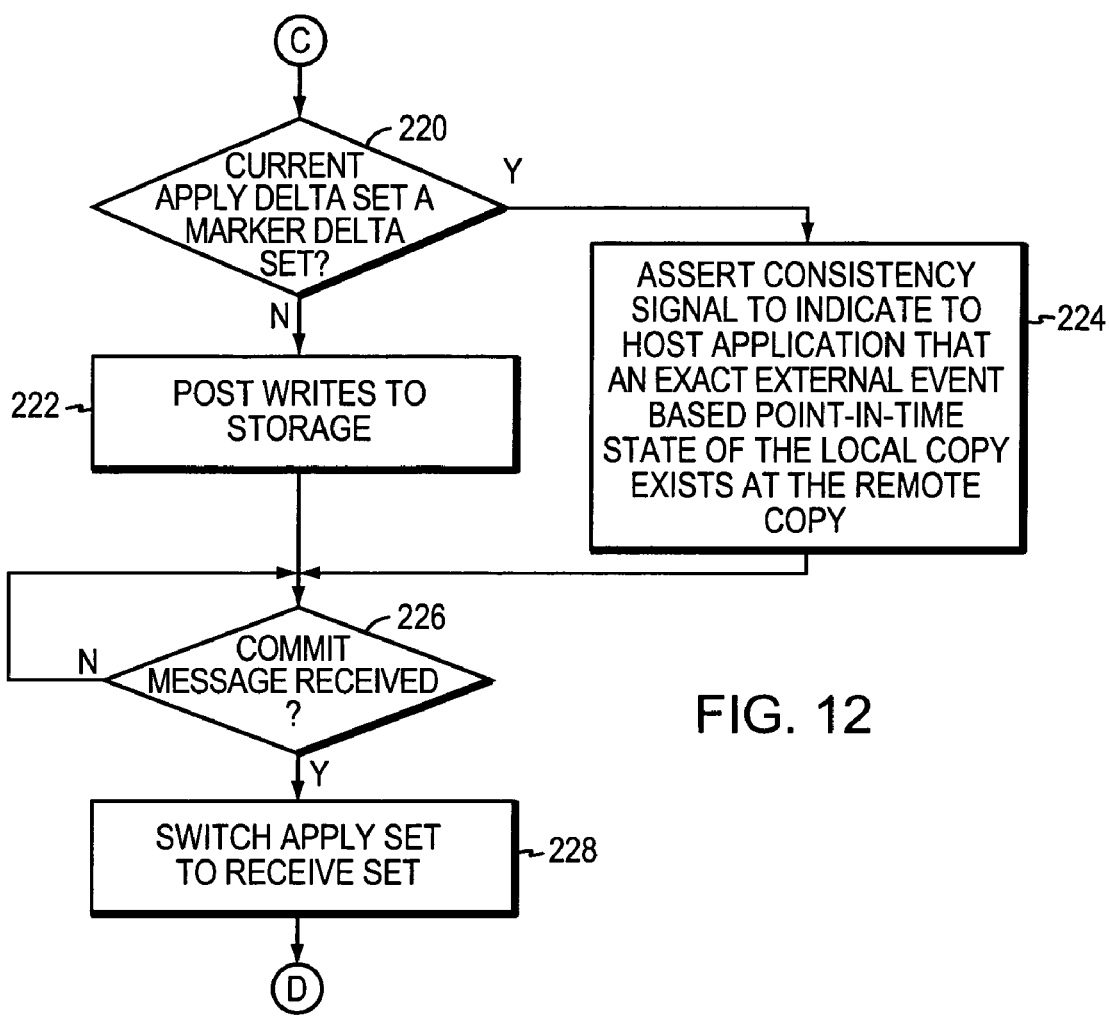
FIG. 12 is a flow diagram of the operation of the apply delta set portion of the delta set based asynchronous remote replication method in accordance with one possible modification to support the implementation of FIG. 9 at the remote site.

The marker delta cycle can be handled at the remote site by modifying the apply delta set process of FIG. 6 as shown in FIG. 12 to generate the consistency signal 152. In this case, the apply process first checks if the apply set is a marker delta set (step 220). If a marker delta set is received, then the consistency signal 152 is generated (step 224). Otherwise writes are posted to the remote copy by the apply delta set process as previously described through steps 222, 226, and 228.

Figure 13:
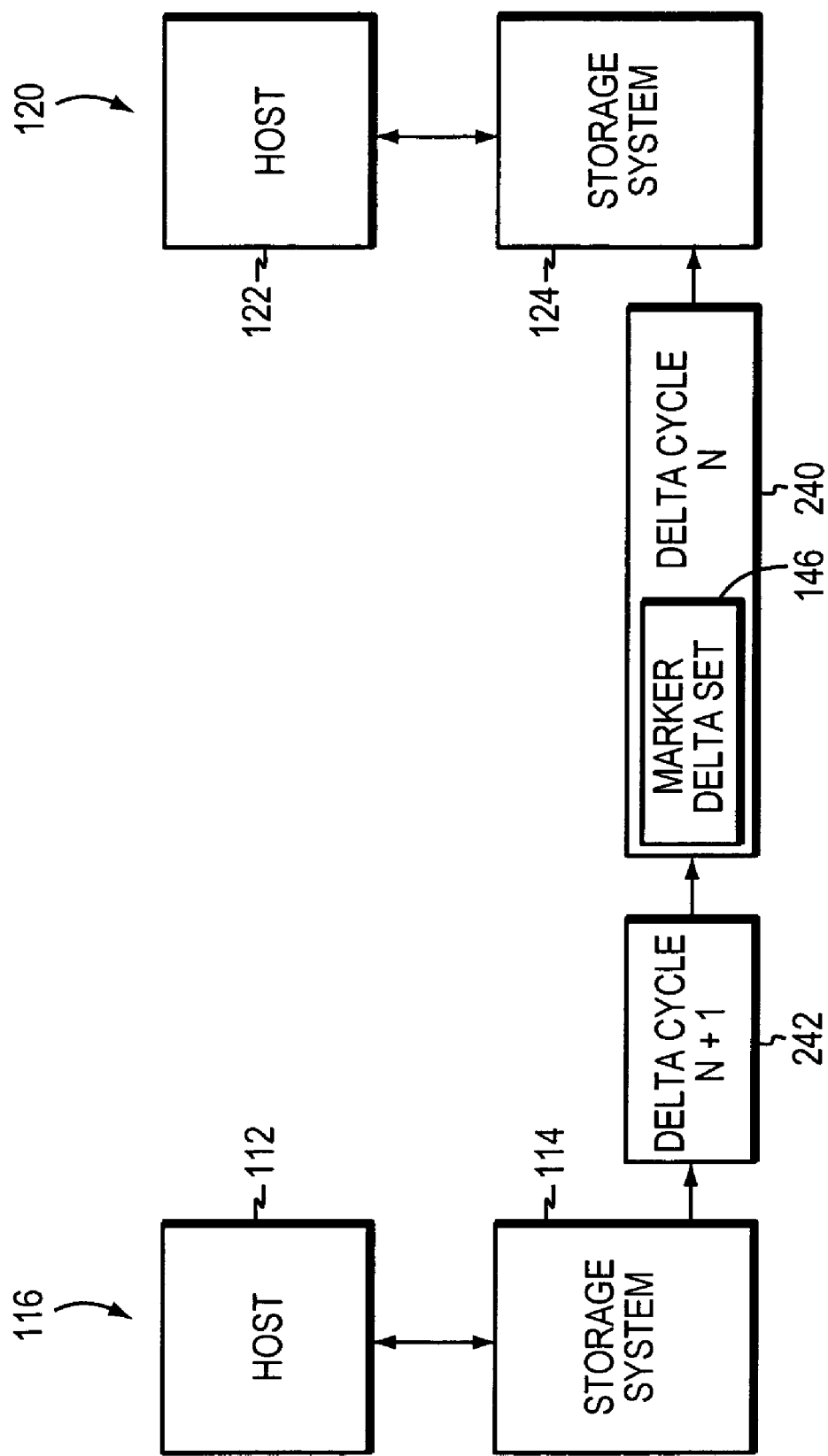
FIG. 13 is a block diagram showing the delta set transfers from the local to remote site for an alternate implementation of the invention.

In accordance with an alternate embodiment, the marker delta set is inserted at the end of the delta cycle in which the external event is received. Referring to FIG. 13, a block diagram depicts the delta cycles transferred between the local site 116 and remote site 120 for this implementation. Delta cycle N (240) includes as its last entries the writes just prior to and in accordance with the external event, followed by the marker delta set 146. Delta cycle N is followed by the next delta cycle N+1 (242).

Figure 14:
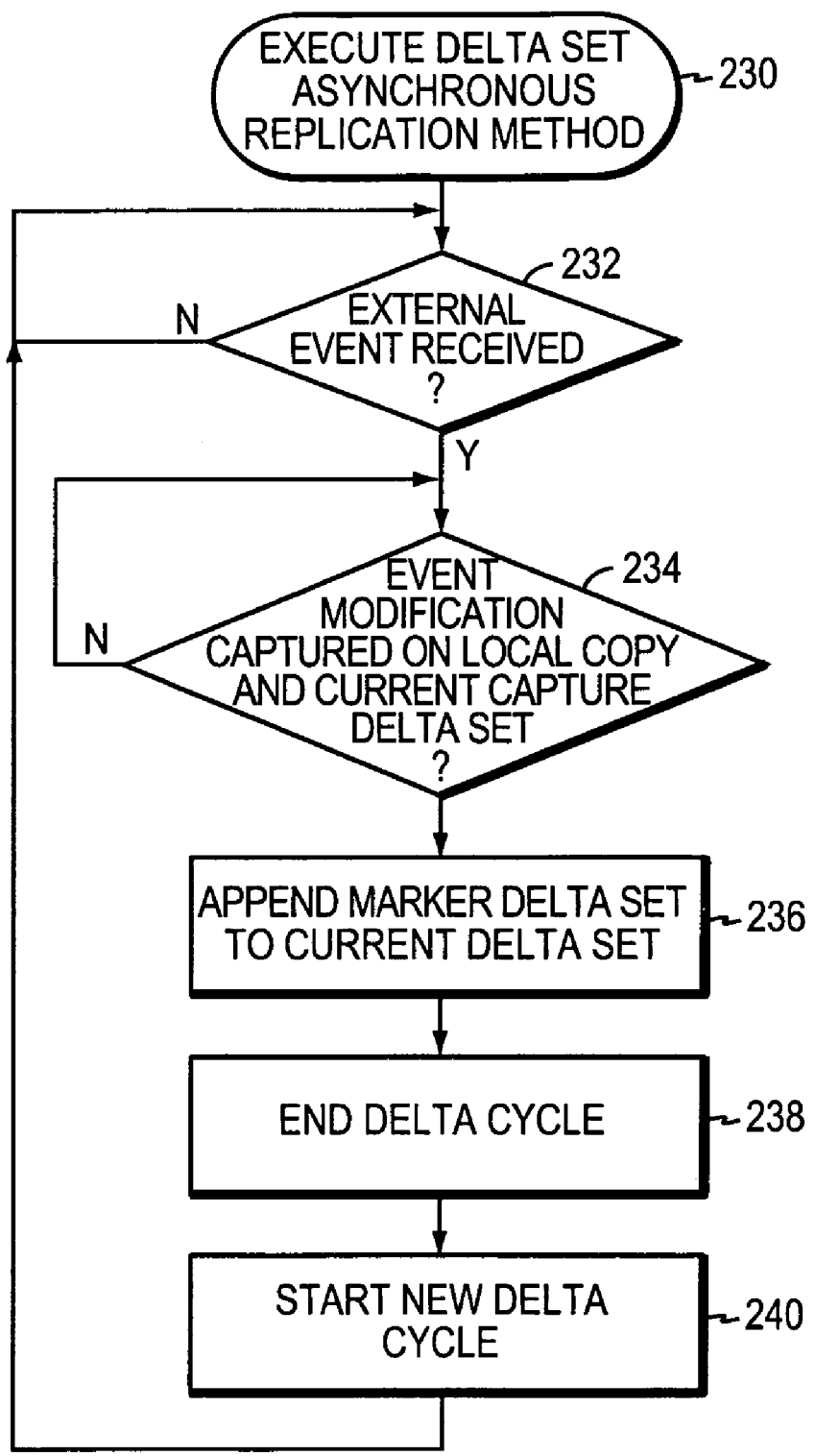
FIG. 14 is a flow diagram of operations at the local site during creation of a marker delta set in accordance with the alternate implementation of the invention shown in FIG. 13.
Figure 15:
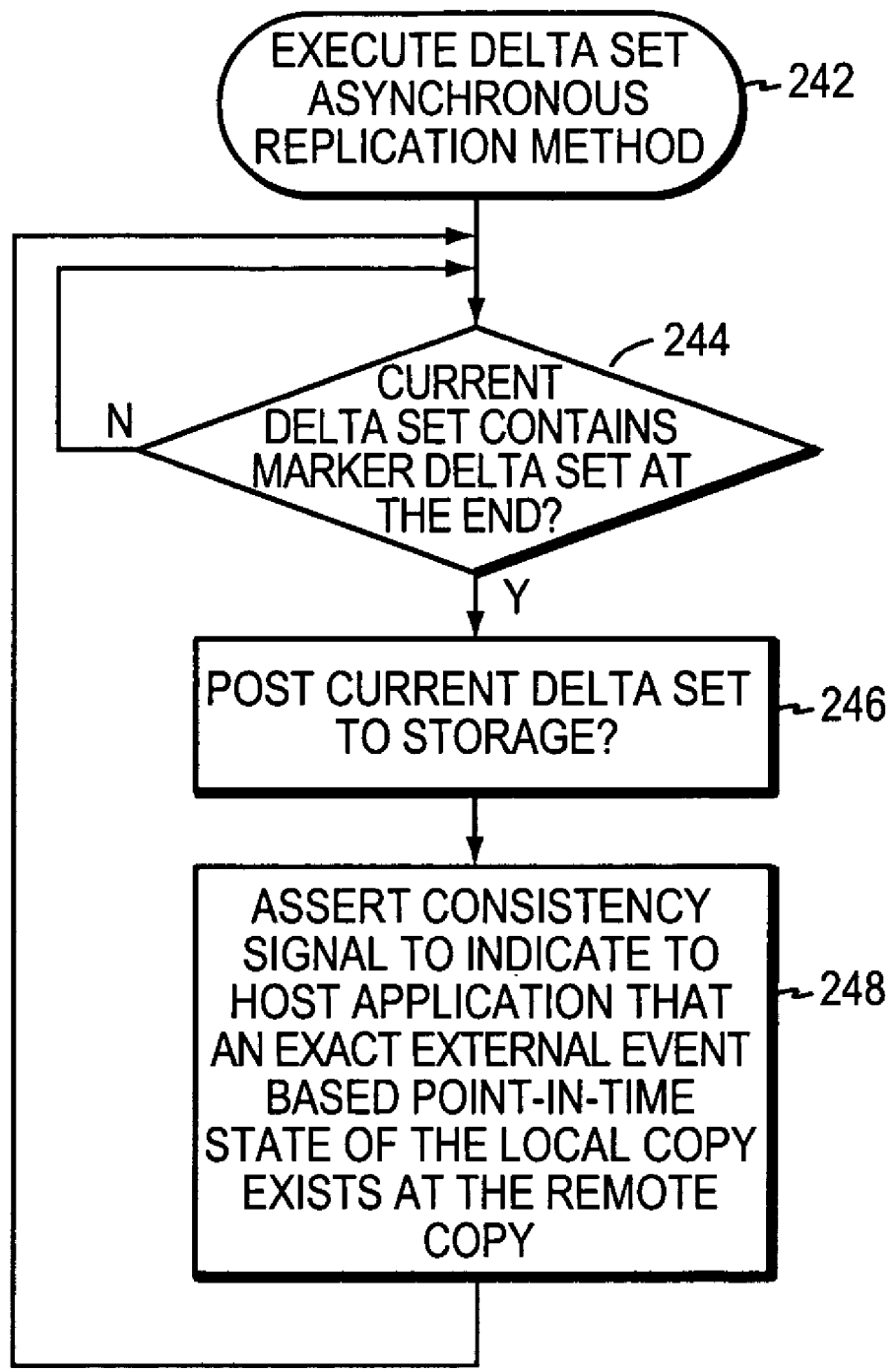
FIG. 15 is a flow diagram of operations at the remote site during receipt of a marker delta set in accordance with the alternate implementation of the invention shown in FIG. 13.

One implementation of the basic steps in the local and remote storage systems, in accordance with the alternate embodiment of the invention, is shown in FIGS. 14 and 15 respectively.

Referring to FIGS. 13 and 14, on the local storage system 114, generally during the execution of the delta set based asynchronous replication method (step 230), if an external event is received at the local storage system 114 during a delta cycle (step 232), then immediately after the modifications just prior to and in accordance with the external event are captured in the local copy and the current delta set (step 234), a marker delta set is appended at the end of the current delta set (step 236) and the current delta cycle is ended (step 238). Normal delta cycles then resume (step 240).

Referring now to FIGS. 7, 13 and 15, on the remote storage system 124, generally during the execution of the delta set based asynchronous replication method (step 242), if a delta set is received with a marker delta set appended at the end (step 244) then it is known that when the current delta set is applied to the remote copy it marks the point where a consistent external event based point-in-time state of the local copy exists on the remote copy. Once the current delta set has been fully posted (step 246), the consistency signal 152 is asserted (step 248) to notify a host applications 126b that the changes on the local copy 140 due to the external synchronizing event 150 have completely been posted to the remote copy 142 and that a consistent external event based point-in-time state of local copy is available at the remote copy for use by the applications 126b.

Figure 16:
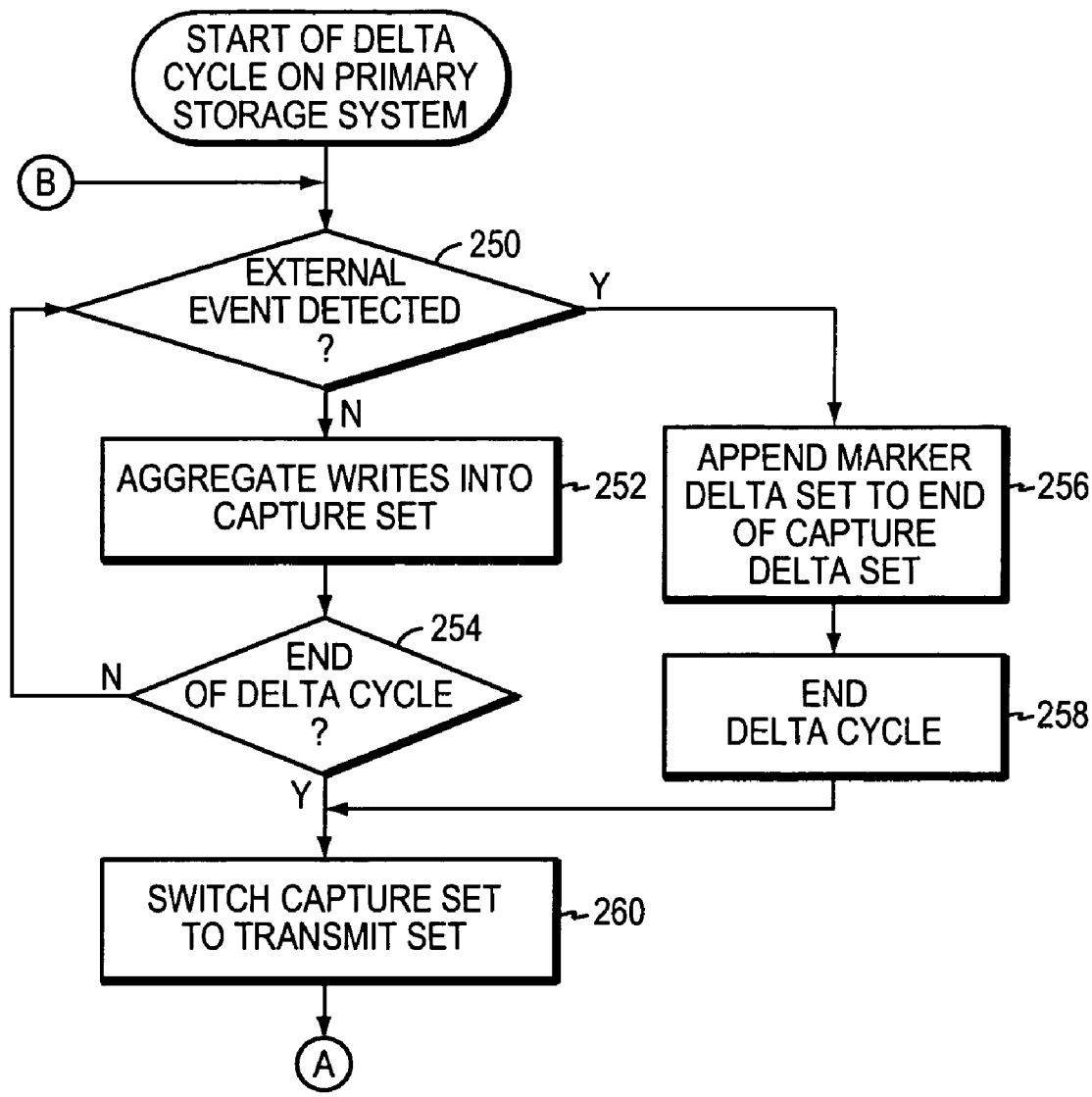
FIG. 16 is a flow diagram showing modifications to the capture delta set portion of the delta set based asynchronous remote replication method of FIG. 3 to support the alternate implementation of the invention shown in FIG. 14.

On the local site, the basic operations of FIG. 14 can be implemented for example by modifying the capture delta set process of FIG. 3 as shown in FIG. 16. Referring to FIGS. 7 and 16, if an external event occurs during write aggregation (step 250, 252), then immediately after the modifications just prior to and in accordance with the external event are captured in the local copy 140 and the current capture set 130, a marker delta set 146 is appended at the end of the current capture set (step 256). The current delta cycle is then ended (step 258). It is now known that the end of the current capture delta set 130 with the marker set 146 includes all the modification just prior to and in accordance with the external event. The capture set then switches to the transmit set (step 260), and the delta set propagates to the remote site as previously described. When no external events are occurring, the delta capture set process of FIG. 16 proceeds as previously described in FIG. 3 through steps 252, 254, and 260.

The transmit delta set and receive delta set processes of FIGS. 4 and 5 proceed as previously described causing the capture delta set with a marker delta set appended at its end to propagate to the remote site as shown in FIG. 13.

Figure 17:
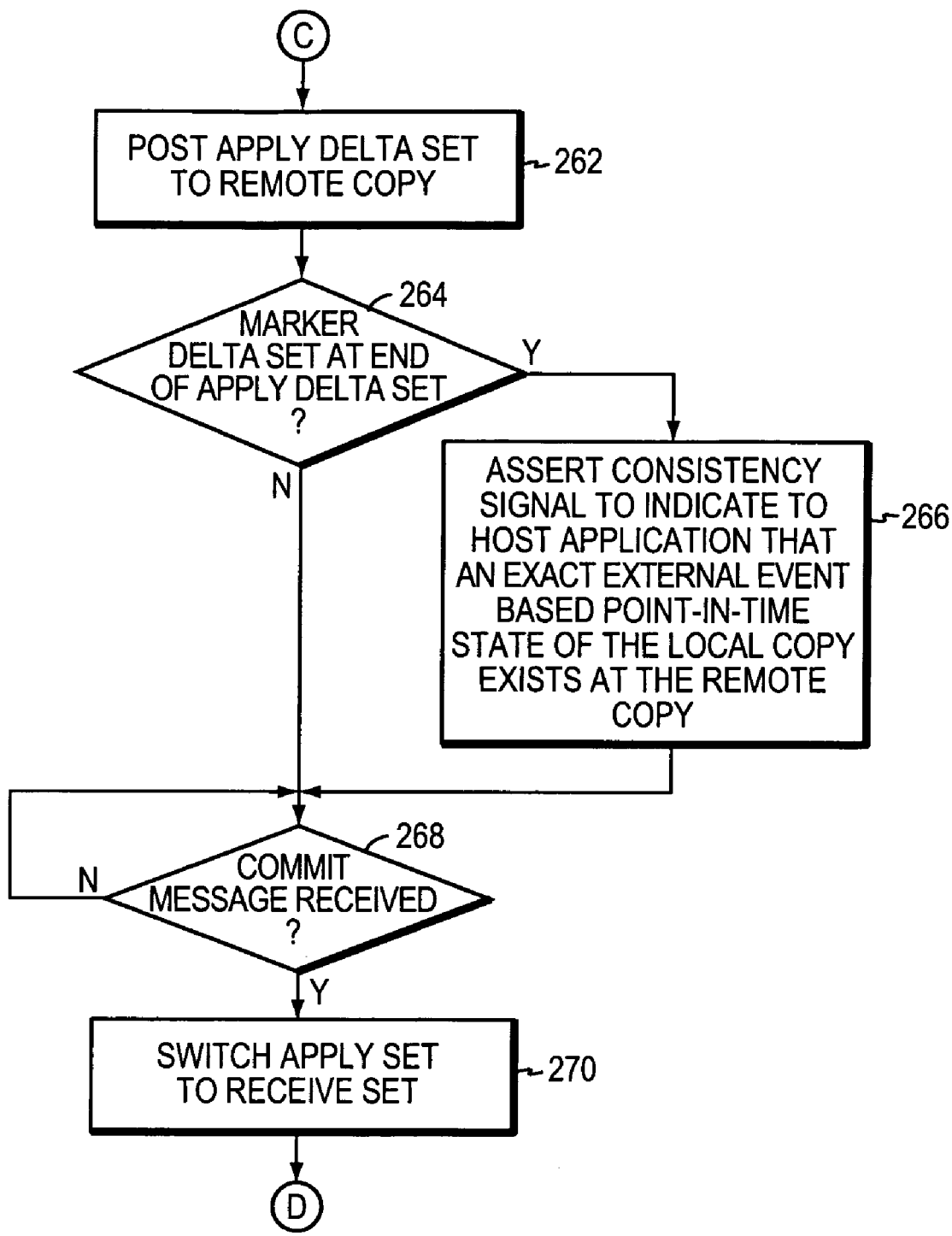
FIG. 17 is a flow diagram showing modifications to the apply delta set portion of the delta set based asynchronous remote replication method of FIG. 6 to support the alternate implementation of the invention shown in FIG. 15.

At the remote site, the basic operations of FIG. 15 can be implemented by modifying the apply delta set process of FIG. 6 as shown in FIG. 17 to generate the consistency signal when a marker delta set is detected. Referring to FIGS. 7 and 17, the apply process posts the apply delta set to remote copy 142 (step 262) and then checks the apply delta set for a marker delta set at the end (step 264). If an apply delta set is received with the marker delta set appended at the end, then it is known that the end of the current apply delta set marks the point where a consistent external event based point-in-time state of the local copy exists on the remote copy. Once this apply delta set is posted to remote copy 142, the consistency signal 152 is sent to notify host applications 126b that a consistent external event based point-in-time state of local copy is available in the remote copy for use by the applications (step 266). The rest of the steps are exactly the same as in FIG. 6. Once a commit message is received (step 268) the apply set switches to the receive set (step 270).

The invention may be implemented at several system locations in several technologies. For example, it may be implemented in the storage system in hardware, or microcode, or layered software. Or, it may be implemented in host based software that has visibility and control of the local and remote copies. Alternately, the invention could also be implemented in the storage network hardware, microcode, or layered software—for example, in an intelligent fabric switch that has visibility and control of the local and remote copies.

Furthermore, the marker delta set is preferably an empty delta set having an asserted flag indicating to the remote storage system that the delta set is a marker delta set. Alternatively, the marker delta set may also be a delta set that includes a particular form of data recognized by the remote storage system as indicating a pre-defined classification of local event, for example an incremental backup event, a full backup event, an hourly test event, a daily reconciliation event or an archiving event for regulatory compliance. The remote storage system can also pass this event classification data to one or more remote hosts to simultaneously start one or more remote applications to process the remote copy.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

I claim:

1. A method for use in a storage system comprising:
  executing a delta set asynchronous remote replication protocol, wherein writes to a local copy on a local storage site are aggregated into delta sets during successive delta cycles, each delta cycle expiring after a certain duration, and wherein, after expiration of a current delta cycle, a current delta set is transmitted to a remote storage site to be written to a remote copy;
  receiving, at the local storage site, a signal representing an external event;
  in response to receiving the signal:
    ending the current delta cycle at the local storage site earlier than when the current delta cycle is due to expire;
    inserting a marker set on the local storage site after the modifications made prior to and in accordance with the external event are captured in the local copy; and
    transmitting the marker set to the remote storage site; and
  monitoring the delta sets received at the remote storage site for the marker set; and
  indicating that the remote copy is consistent with the local copy in response to the receipt of the marker set at the remote storage site.

2. The method of claim 1 wherein the step of inserting a marker set comprises the steps of:
  starting a marker delta cycle;
  inserting the marker set during the marker delta cycle;
  ending the marker delta cycle.

3. A method for use in a storage system comprising:
  executing a delta set asynchronous remote replication protocol, wherein writes to a local copy on a local storage site are aggregated into delta sets during successive delta cycles, each delta cycle expiring after a certain duration, and wherein, after expiration of a current delta cycle, a current delta set is transmitted to a remote storage site to be written to a remote copy;
  receiving, at the local storage site, a signal representing an external event;
  in response to receiving the signal:
    stopping the current delta cycle of the delta set asynchronous remote replication protocol earlier than when the current delta cycle is due to expire;
    inserting a marker set on the local storage site after the modifications made prior to and in accordance with the external event are captured in the local copy; and
    resuming the delta set asynchronous remote replication protocol after inserting the marker set on the local storage site.

4. The method of claim 3 wherein the step of stopping the delta set asynchronous remote replication protocol comprises the step] of:
  starting a marker delta cycle after ending the current delta cycle;
  and wherein the step of resuming the delta set asynchronous remote replication protocol comprises the step of:
  ending the marker delta cycle.

5. The method of claim 3 further comprising the steps of:
  sending the marker set to the remote storage site;
  monitoring for the marker set at the remote storage site;
  indicating that the remote copy is consistent with the local copy in response to receipt of the marker set at the remote storage site.

6. The method of claim 4 further comprising the steps of:
  sending the marker set to the remote storage site;
  monitoring for the marker set at the remote storage site;
  indicating that the remote copy is consistent with the local copy in response to receipt of the marker set at the remote storage site.

7. A storage system comprising:
  a physical primary storage system at a local storage site in communication with a physical remote storage system at a remote storage site;

logic executing a delta set asynchronous remote replication protocol, wherein writes to a local copy on the primary storage system at the local storage site are aggregated into delta sets during successive delta cycles, each delta cycle expiring after a certain duration, and wherein, after expiration of a current delta cycle, a current delta set is transmitted to the remote storage system at the remote storage site to be written to a remote copy;

logic receiving, at the primary storage system at the local storage site, a signal representing an external event;

logic, responsive to the received signal, ending the current delta cycle at the primary storage system at the local storage site earlier than when the current delta cycle is due to expire, inserting a marker set on the primary storage system at the local storage site after the modifications made prior to and in accordance with the external event are captured in the local copy, and transmitting the marker set to the remote storage system at the remote storage site;

logic monitoring the delta sets received at the remote storage system at the remote storage site for the marker set; and logic indicating that the remote copy is consistent with the local copy in response to the receipt of the marker set at the remote storage system at the remote storage site.

8. The storage system of claim 7 wherein the logic that inserts a marker set comprises:
 logic for starting a marker delta cycle;
 logic for inserting the marker set during the marker delta cycle;
 logic for ending the marker delta cycle.

9. A storage system comprising:
 a physical primary storage system at a local storage site in communication with a physical remote storage system at a remote storage site;
 logic executing a delta set asynchronous remote replication protocol, wherein writes to a local copy on the primary storage system at the local storage site are aggregated into delta sets during successive delta, each delta cycle expiring after a certain duration, and wherein, after expiration of a current delta cycle, a current delta set is transmitted to the remote storage system at the remote storage site to be written to a remote copy;
 logic receiving, at the primary storage system at the local storage site, a signal representing an external event;
 logic responsive to the received signal:
  stopping the current delta cycle of the delta set asynchronous remote replication protocol earlier than when the current delta cycle is due to expire;
  inserting a marker set on the primary storage system at the local storage site after the modifications made prior to and in accordance with the external event are captured in the local copy; and
  resuming the delta set asynchronous remote replication protocol after inserting the marker set on the primary storage system at the local storage site.

10. The storage system of claim 9 wherein the logic that stops the delta set asynchronous remote replication protocol comprises:
 logic for starting a marker delta cycle after ending the current delta cycle;
 and wherein the logic that resumes the delta set asynchronous remote replication protocol comprises:
 logic for ending the marker delta cycle.

11. The storage system of claim 9 further comprising:
 logic for sending the marker set to the remote storage system at the remote storage site;
 logic for monitoring for the marker set at the remote storage system at the remote storage site;
 logic for indicating that the remote copy is consistent with the local copy in response to receipt of the marker set at the remote storage system at the remote storage site.

12. The storage system of claim 10 further comprising:
 logic for sending the marker set to the remote storage system at the remote storage site;
 logic for monitoring for the marker set at the remote storage system at the remote storage site;
 logic for indicating that the remote copy is consistent with the local copy in response to receipt of the marker set at the remote storage system at the remote storage site.

13. A program product for use in a storage system, the program product comprising a computer readable medium having embodied therein a computer program for storing data, the computer program comprising:
 logic for executing a delta set asynchronous remote replication protocol, wherein writes to a local copy on a local storage site are aggregated into delta sets during successive delta cycles, each delta cycle expiring after a certain duration, and wherein, after expiration of a current delta cycle, a current delta set is transmitted to a remote storage site to be written to a remote copy;
 logic for receiving, at the local storage site, a signal representing an external event;
 logic, responsive to the received signal, for ending the current delta cycle at the local storage site earlier than when the current delta cycle is due to expire, for inserting a marker set on the local storage site after the modifications made prior to and in accordance with the external event are captured in the local copy, and for transmitting the marker set to the remote storage site;
 logic for monitoring the delta sets received at the remote storage site for the marker set; and
 logic for indicating that the remote copy is consistent with the local copy in response to the receipt of the marker set at the remote storage site.

14. The program product of claim 13 wherein the logic for inserting a marker set comprises the steps of:
 logic for starting a marker delta cycle;
 logic for inserting the marker set during the marker delta cycle; and
 logic for ending the marker delta cycle.

15. A program product for use in a storage system, the program product comprising a computer readable medium having embodied therein a computer program for storing data, the computer program comprising:
 logic for executing a delta set asynchronous remote replication protocol, wherein writes to a local copy on a local storage site are aggregated into delta sets during successive delta, each delta cycle expiring after a certain duration, and wherein, after expiration of a current delta cycle, a current delta set is transmitted to a remote storage site to be written to a remote copy;
 logic for receiving, at the local storage site, a signal representing an external event;
 logic responsive to the received signal for:
  stopping the current delta cycle of the delta set asynchronous remote replication protocol earlier than when the current delta cycle is due to expire;
  inserting a marker set on the local storage site after the modifications made prior to and in accordance with the external event are captured in the local copy; and
  resuming the delta set asynchronous remote replication protocol after inserting the marker set on the local storage site.

16. The program product of claim 15 wherein the logic for stopping the delta set asynchronous remote replication protocol comprises:
  logic for starting a marker delta cycle after ending the current delta cycle;
  and wherein the logic for resuming the delta set asynchronous remote replication protocol comprises:
  logic for ending the marker delta cycle.

17. The program product of claim 15 further comprising:
  logic for sending the marker set to the remote storage site;
  logic for monitoring for the marker set at the remote storage site;
  logic for indicating that the remote copy is consistent with the local copy in response to receipt of the marker set at the remote storage site.

18. The program product of claim 16 further comprising:
  logic for sending the marker set to the remote storage site;
  logic for monitoring for the marker set at the remote storage site;
  logic for indicating that the remote copy is consistent with the local copy in response to receipt of the marker set at the remote storage site.

\* \* \* \* \*